US011512511B2

United States Patent
Timms et al.

(10) Patent No.: US 11,512,511 B2
(45) Date of Patent: Nov. 29, 2022

(54) LOCKING MECHANISM (71) Applicant: Goodrich Actuation Systems Limited, Solihull (GB)

(72) Inventors: Jack William Timms, Wolverhampton (GB); Tim Hudson, Shropshire (GB)

(73) Assignee: GOODRICH ACTUATION SYSTEMS LIMITED, Solihull West Midlands (GB)

( * ) Notice: Subject to any disclaimer, the term of this patent is extended or adjusted under 35 U.S.C. 154(b) by 626 days.

(21) Appl. No.: 16/546,697

(22) Filed: Aug. 21, 2019

(65) Prior Publication Data
US 2020/0063474 A1  Feb. 27, 2020

(30) Foreign Application Priority Data

Aug. 21, 2018 (EP) .................................... 18275130

(51) Int. Cl.
*E05C 19/12* (2006.01)
*F02K 1/76* (2006.01)
(Continued)

(52) U.S. Cl.
CPC ................ *E05C 19/12* (2013.01); *E05C 3/02* (2013.01); *E05C 3/34* (2013.01); *F02K 1/766* (2013.01);
(Continued)

(58) Field of Classification Search
CPC . E05B 51/02; E05C 3/34; E05C 19/12; E05C 3/02; F16B 7/185; F16B 5/0642;
(Continued)

(56) References Cited

U.S. PATENT DOCUMENTS 2,096,980 A * 10/1937 Schjolin .................... E05C 3/34
292/DIG. 40
2,780,057 A * 2/1957 Stavert ...................... F02K 1/76
239/265.19
(Continued)

FOREIGN PATENT DOCUMENTS

CN         105508352 A     4/2016
EP         0763654 A1      3/1997
(Continued)

OTHER PUBLICATIONS

Extended European Search Report for International Application No. 18275130.5 dated Feb. 6, 2019, 16 pages.

*Primary Examiner* — Christine M Mills
*Assistant Examiner* — Faria F Ahmad
(74) *Attorney, Agent, or Firm* — Cantor Colburn LLP (57) ABSTRACT

A locking mechanism comprises an S-shaped locking member which comprises respective locking hooks arranged at the end of opposed arms of the locking member. A pivot is arranged between the arms of the locking member. The locking member rotates around the axis (A) of the pivot. The locking mechanism further comprises a coupling for coupling the locking member to an actuator for rotating the locking member around the pivot axis (A). The coupling comprises at least one coupling element, an actuator coupling for coupling the at least one coupling element to the actuator and first and second drive couplings for coupling the at least one coupling element independently to each arm of the locking member for transmitting rotational movement thereto, such that failure of one arm of the locking member will not cause loss of drive to the other arm of the locking member.

11 Claims, 10 Drawing Sheets (51) Int. Cl.
*E05C 3/02* (2006.01)
*F16B 7/18* (2006.01)
*E05C 3/34* (2006.01)
*E05B 51/02* (2006.01)
*F16B 5/06* (2006.01)

(52) U.S. Cl.
CPC .............. *F16B 7/185* (2013.01); *E05B 51/02* (2013.01); *F16B 5/0642* (2013.01); *Y10S 292/21* (2013.01); *Y10T 292/0922* (2015.04); *Y10T 292/1043* (2015.04); *Y10T 292/1044* (2015.04); *Y10T 292/1045* (2015.04); *Y10T 292/1082* (2015.04)

(58) Field of Classification Search
CPC .. F16B 5/02; F16B 39/04; F16B 45/00; Y10S 292/21; Y10T 292/1082; Y10T 292/1043; Y10T 292/1044; Y10T 292/1045; Y10T 292/0922
See application file for complete search history.

(56) References Cited

U.S. PATENT DOCUMENTS

| | | | |
|---|---|---|---|
| 3,194,595 | A | 7/1965 | Wheeler et al. |
| 3,561,802 | A * | 2/1971 | Brockway ................ E05C 3/34 |
| | | | 292/49 |
| 4,671,460 | A | 6/1987 | Kennedy et al. |
| 4,679,750 | A * | 7/1987 | Burhans ................ B64D 29/06 |
| | | | 244/129.4 |
| 4,877,274 | A * | 10/1989 | Poe ....................... E05C 19/145 |
| | | | 292/108 |
| 5,819,527 | A | 10/1998 | Fournier |
| 7,104,500 | B1 | 9/2006 | Smith |
| 10,662,897 | B2 * | 5/2020 | Kopecek ................. F02K 1/763 |
| 2002/0145078 | A1 | 10/2002 | Rouyer et al. |
| 2011/0007457 | A1 * | 1/2011 | Dong ....................... E05C 3/34 |
| | | | 361/679.01 |
| 2016/0053720 | A1 | 2/2016 | Kioua et al. |
| 2017/0022934 | A1 | 1/2017 | Caruel et al. |
| 2017/0226963 | A1 | 8/2017 | Kopecek et al. |

FOREIGN PATENT DOCUMENTS

| | | |
|---|---|---|
| EP | 1988239 A2 | 11/2008 |
| WO | 2014140491 A1 | 9/2014 |
| WO | 2015140450 A1 | 9/2015 |

* cited by examiner

LOCKING MECHANISM

FOREIGN PRIORITY

This application claims priority to European Patent Application No. 18275130.5 filed Aug. 21, 2018, the entire contents of which is incorporated herein by reference.

TECHNICAL FIELD

The present disclosure relates to locking mechanisms and in particular to locking mechanisms using an S-shaped locking member.

BACKGROUND

Locking mechanisms using an S-shaped locking member are used in a wide range of applications. In the field of aircraft engines, for example, the mechanism may be used in locking "bucket" or "clamshell" thrust reverser doors in a retracted position. Such an arrangement is illustrated for example in U.S. Pat. No. 4,671,460 A.

Typically, the S-shaped locking member comprises a pair of hooks provided at the ends of opposed arms of the locking member. The hooks engage with catches on the components being locked when the locking member is in its locking position. The locking member is pivotally mounted about a central pivot and is rotated about the pivot by means of an actuator, for example a hydraulic actuator, which is hingedly connected to the locking member via a clevis connection, for example, at a position intermediate the pivot and one of the hooks. Extension or retraction of the actuator rotates the entire locking member about the pivot, thereby bringing both hooks into or out of locking engagement with their respective catches.

While this construction is generally satisfactory, should the locking member fail at a position between the point of attachment of the actuator to the locking member and the pivot then no actuating movement may be applied to either hook, effectively disabling the entire mechanism.

SUMMARY

The present disclosure provides a locking mechanism which comprises an S-shaped locking member which has respective locking hooks arranged at the end of opposed arms of the locking member. A pivot is arranged between the arms of the locking member and the locking member rotates around the axis of the pivot.

A coupling couples the locking member to an actuator for rotating the locking member around the pivot axis. The coupling comprises at least one coupling element, an actuator coupling for coupling the at least one coupling element to the actuator and first and second drive couplings for coupling the at least one coupling element independently to each arm of the locking member for transmitting rotational movement thereto, such that failure of one arm of the locking member will not cause loss of drive to the other arm of the locking member.

The at least one coupling element may comprise a plate.

The first and second drive couplings may each comprise a dog element engaging with the at least one coupling element and the locking member.

The dog element may be a drive pin or bolt extending from the respective locking member arm.

The drive pin or bolt may extend through the at least one coupling element and the respective locking member arm.

The dog element may be received in an open ended slot formed in an end of a coupling element.

An axis of the slot may be angled relative to an axis defined between the dog elements and passing through the pivot axis.

The at least one coupling element may be located, optionally loosely, in a recess formed in a face of the locking member.

The locking mechanism may comprise a pair of coupling elements, arranged on opposed faces of the locking member, so as to sandwich a portion of the locking member therebetween.

The locking member may be formed as a unitary, one piece element.

In an alternative embodiment, the locking member may comprise two separate arms each pivotally mounted about the pivot axis.

In some embodiments, the locking mechanism may comprise a single coupling element.

In such embodiments, the locking member may comprise two separate arms each pivotally mounted about the pivot axis and the single coupling element may be sandwiched between the arms of the locking member.

The actuator coupling may comprise an arm extending laterally from the coupling element.

The locking mechanism may further comprise an actuator coupled to the actuator coupling for rotating the locking member around the pivot axis.

The disclosure also extends to a bucket type thrust reverser system comprising a pair of thrust reversing doors and a locking mechanism in accordance with the disclosure for locking the thrust reverser doors in a desired operative position, for example a retracted position.

BRIEF DESCRIPTION OF DRAWINGS

Some embodiments of the disclosure will now be described by way of example only with reference to the accompanying drawings in which.

DETAILED DESCRIPTION

FIGS. 1 to 4 illustrate a first embodiment of locking mechanism 2 in accordance with the disclosure.

In broad terms, the locking mechanism 2 comprises a generally S-shaped locking member 4 which has respective locking hooks 6*a*, 6*b* arranged at the respective ends of opposed arms 8*a*, 8*b* of the locking member 4. While the arms 8a, 8b are shown as slightly curved in this embodiment, they may be straighter or more curved in other embodiments. For example, in other embodiments, the arms 8a, 8b may be straight and the hooks 6a, 6b extend generally perpendicularly therefrom. The term "S-shaped" should therefore be construed broadly in the context of the present disclosure.

A pivot 10 is arranged between the arms 8a, 8b of the locking member 4. The pivot 10 may be suitably mounted at its lower end to a support (not shown). The locking member 4 is rotatable around the axis A of the pivot 10 and includes a central opening 12 to receive a corresponding section 14 of the pivot 10 (see, for example, FIG. 3).

The locking member 4 is rotated about the pivot axis A by means of an actuator 16. The actuator 16 illustrated in the embodiment is a hydraulic actuator but other forms of linear actuator, for example pneumatic or electrical actuators, may be used within the scope of the disclosure.

The actuator 16 is attached at one end 18 to a support (not shown). The attachment may be a simple pin joint or spherical joint 20 as illustrated in some embodiments. The actuator 16 is attached at its other end 22 to the locking member 4 by means of a coupling 24 which will be discussed in further detail below.

Figure 1:
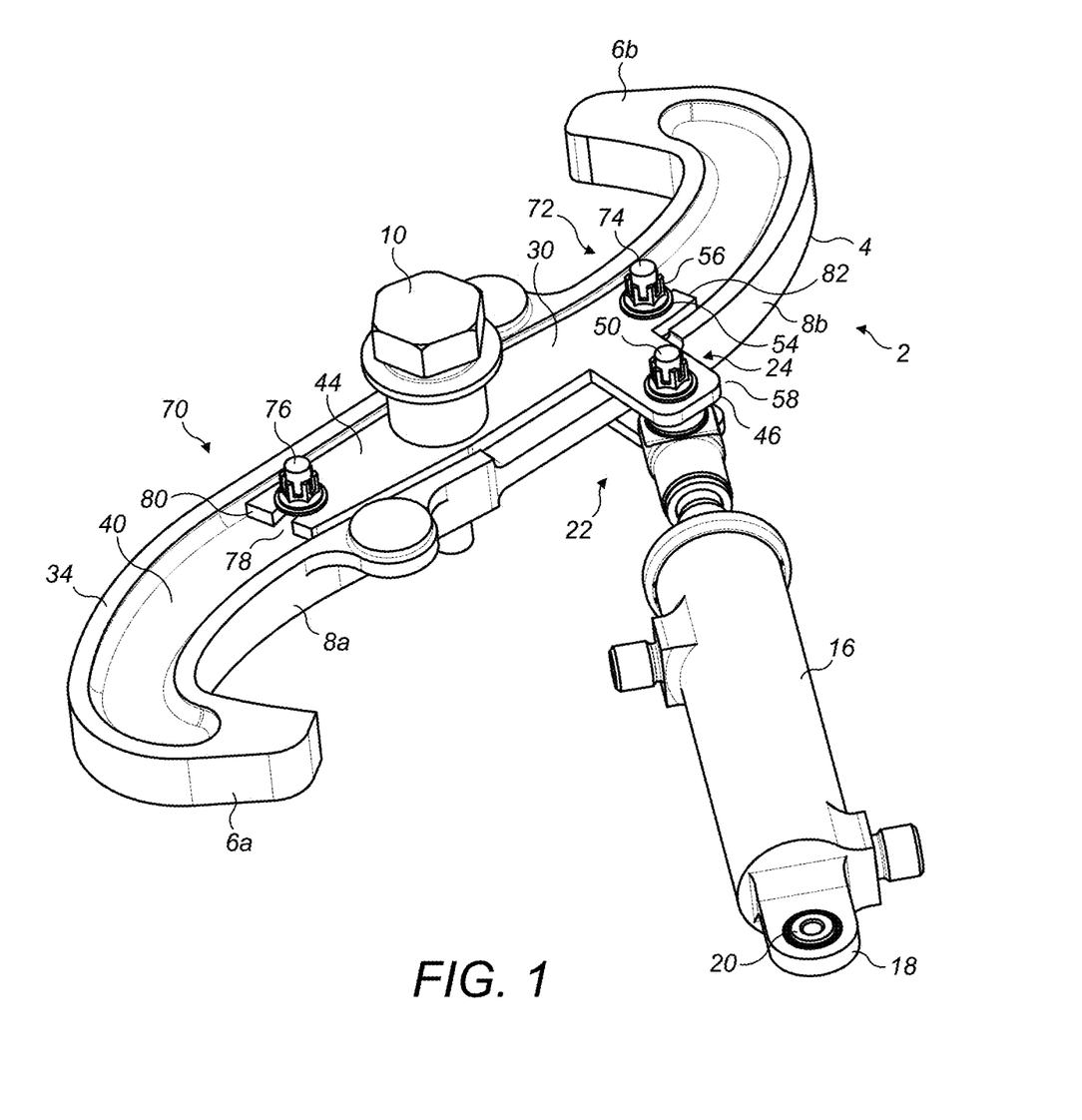
FIG. 1 shows a perspective view of a locking mechanism in accordance with the disclosure.
Figure 2:
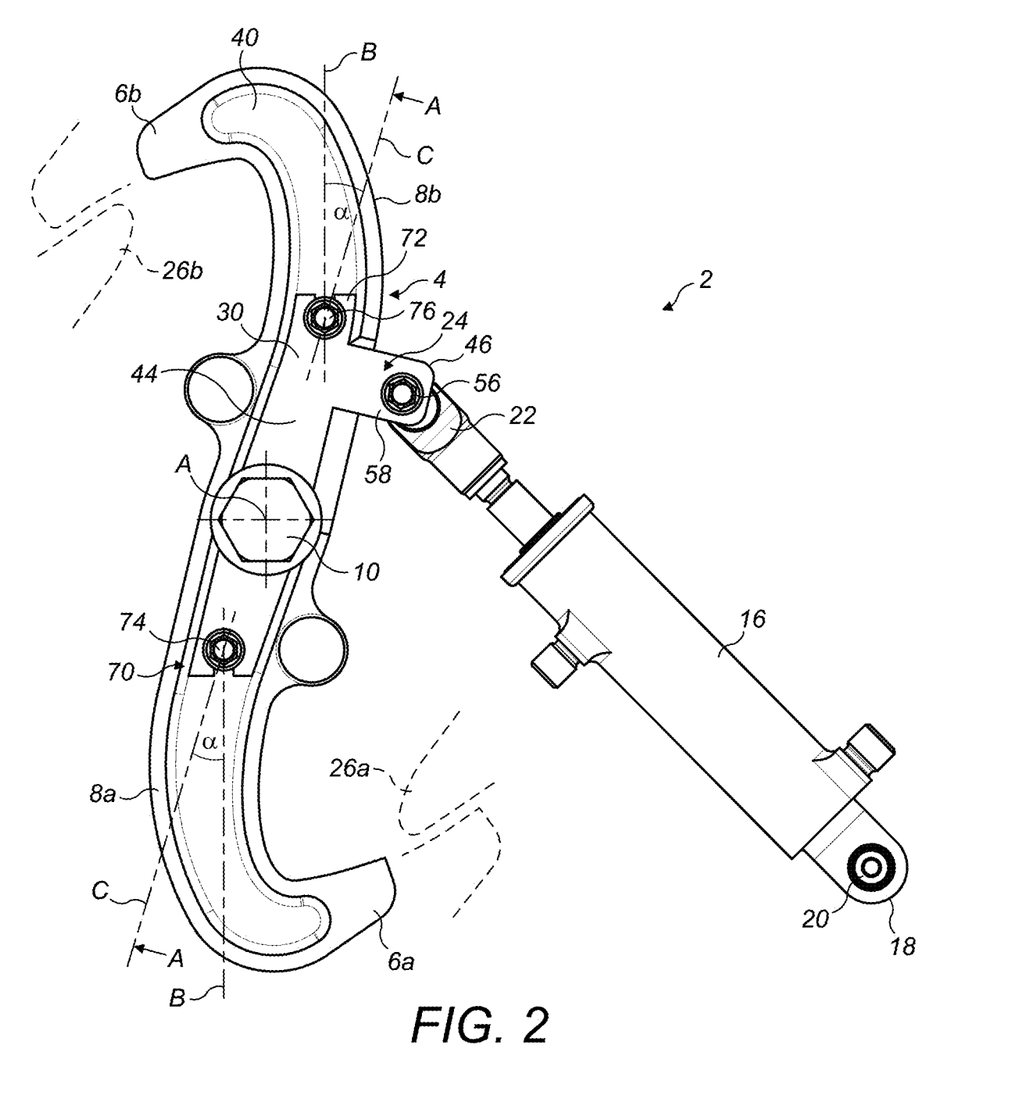
FIG. 2 shows a plan view of the locking mechanism of FIG. 1.

The locking member 4 is rotated between an open position, illustrated in the Figures, and a locked position, illustrated partially in phantom in FIG. 2, in which the hooks 6a 6b engage with catches 26a, 26b which are provided on the components to be locked.

As described so far, the locking mechanism 2 is generally conventional. The coupling 24 between the actuator 16 and the locking member 4, however, is significantly different in the locking mechanism 2 of the present disclosure.

Figure 3:
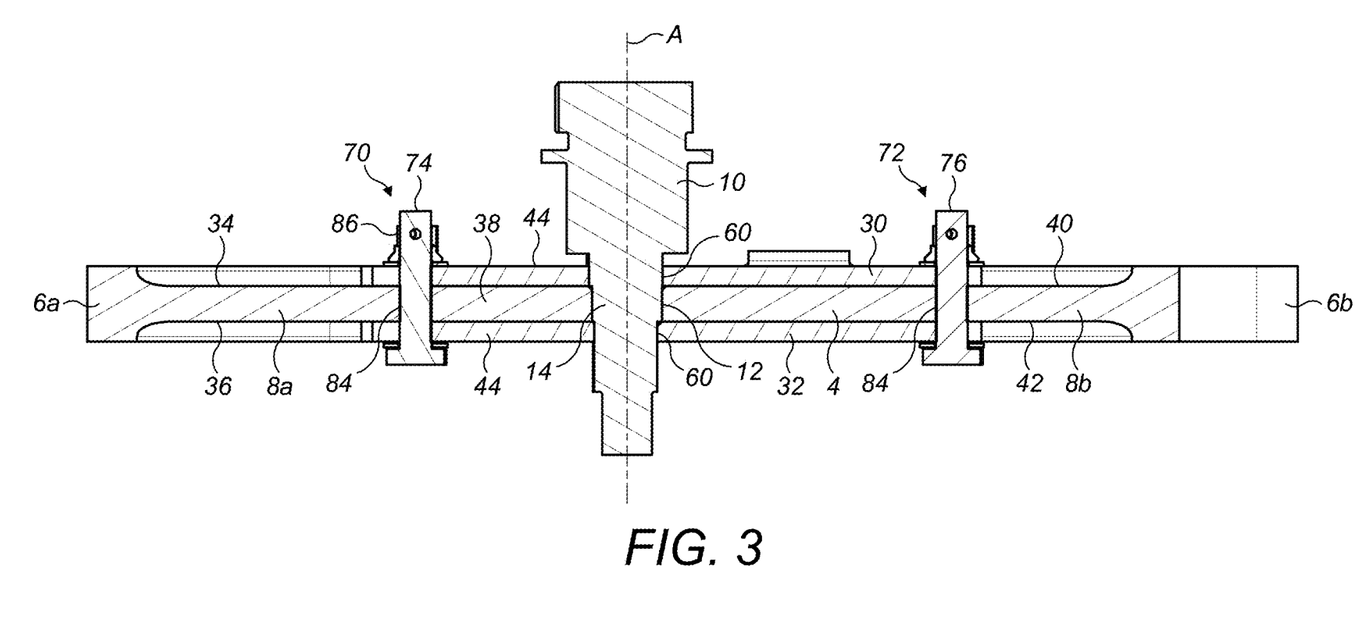
FIG. 3 shows a sectional view along line A-A of FIG. 2.

The coupling 24 of this embodiment comprises a first coupling element 30, in this embodiment in the form of a plate and a second coupling element 32 also in the form of a plate (see, for example, FIG. 3). In this embodiment, the first and second coupling elements 30, 32 have substantially the same shape. The coupling elements 30, 32, are arranged on opposed faces 34, 36 of the locking member 4 so as to sandwich a central portion 38 of the locking member 4, which includes the pivot opening 12, therebetween.

The coupling elements 30, 32 in this embodiment are received in recesses 40, 42 formed in the respective faces 34, 36 of the locking member 4. The coupling elements 30, 32, may be loosely received within the recesses 40, 42 such that in the event of failure of one or more of the locking member arms 8a, 8b the locking member arms 8a, 8b may easily disengage from the recesses 40, 42.

Each coupling element 30, 32 has a central section 44 which is received in the recesses 40, 42 and a side arm 46 which projects from the central section 44 for coupling to the opposed end 22 of the actuator 16. In this embodiment, the central section 44 is generally straight, although it may vary in shape, depending on the particular shape of the locking member 4.

Figure 4:
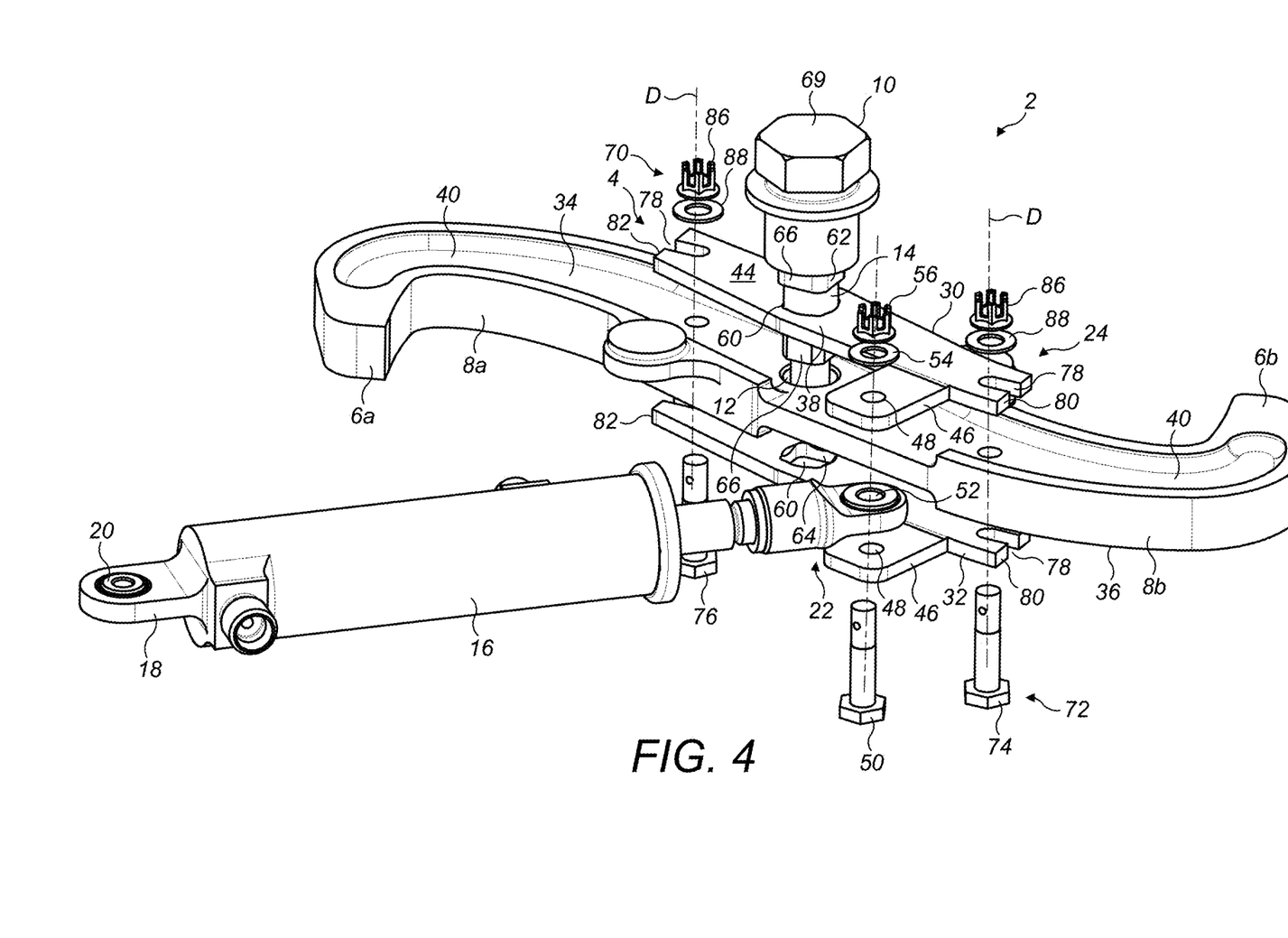
FIG. 4 shows an exploded view of the locking mechanism of FIG. 1.

As can be seen most clearly from FIG. 4, each side arm 46 is provided with an opening 48 for receiving a bolt 50 which passes through the aligned openings 48 and through an opening 52 in the opposed end 22 of the actuator 16 and is retained by means of an optional washer 54 and a fastener 56 such as a lock nut. This provides a pivotal actuator coupling 58 between the actuator 16 and the coupling elements 30, 32.

The central section 44 of each coupling element 30, 32 comprises a generally central opening 60 which receives a corresponding portion 62 of the pivot 10. In this embodiment, the opening 60 in the lower coupling element 32 is slightly smaller in diameter than that of the corresponding opening 60 in the upper coupling element 30 and also slightly smaller diameter than that of the opening 12 in the locking member 4 so as to allow the pivot 10 to be inserted through the assembly.

In this embodiment, the central openings 60 in the coupling elements 30, 32 are non-circular having flattened opposed sides 64, and the corresponding portion 62 of the pivot 10 has a complementary shape with flattened sides 66 such that the coupling elements 30, 32 are rotationally keyed to the pivot 10. In this embodiment, therefore, the entire pivot 10 will rotate. The central openings 60 may also comprise other non-circular shapes such as a square (see FIG. 8) for example. The head 69 of the pivot 10 has a hexagonal shape so as to allow for the locking member 4 to be manually driven through the pivot 10. In other embodiments, however, the pivot 10 may be static and the coupling elements 30. 32 and locking member 4 rotate about the pivot 10.

The coupling 24 comprises first and second drive couplings 70, 72 between the coupling elements 30, 32 and the locking member 4. The first and second drive couplings 70, 72 are independent from each other, each transmitting drive from the actuator 16 into a respective locking member arm 8a, 8b independently of the other drive arm 8a, 8b.

Each of the first and second drive couplings 70, 72 is configured as a dog drive, comprising a dog element 74, 76 engaging with the coupling elements 30, 32 and the locking member 4.

Each coupling element 30, 32 is formed with a slot 78 in each of its ends 80, 82. As can be seen from FIG. 2 in particular, the axis B of each slot 78 is at an angle α to an axis C defined through the vertical axes D of the dog elements 74, 76 and the axis A of pivot 10. The slot 78 is inclined in the direction towards the respective hook 6a, 6b, as this may facilitate disengagement of the locking arm 8a, 8b from the dog elements 74, 76 in the event of the locking arms 8a, 8b failing, as will be discussed further below. Ideally the slots 78 should follow the exit path of the locking arms 8a, 8b in the case of a fracture. In this embodiment, the hooks 6a, 6b will be pulled straight along one axis. In other embodiments, however, should the path of the hooks 6a, 6B follow a curved path, the slots 78 may be similarly curved.

In this embodiment, each dog element 74, 76 is configured as a pin or a bolt which extends through a respective opening 84 in the respective arm 8a, 8b of the locking member 4. As can be best appreciated from FIG. 4, the dog elements 74, 76 are retained in position by a fastener 86, for example a threaded fastener for example a lock nut and an optional washer 88. The fastener 86 may be fastened sufficiently tightly to prevent excessive vertical movement of the pin or bolt 74, 76 but at the same time not so tightly that the locking member 4 becomes clamped between the coupling members 30, 32. This will facilitate disengagement of the locking member arms 8a, 8b from the coupling 24 in the event of a failure in the locking member 4.

Figure 5:
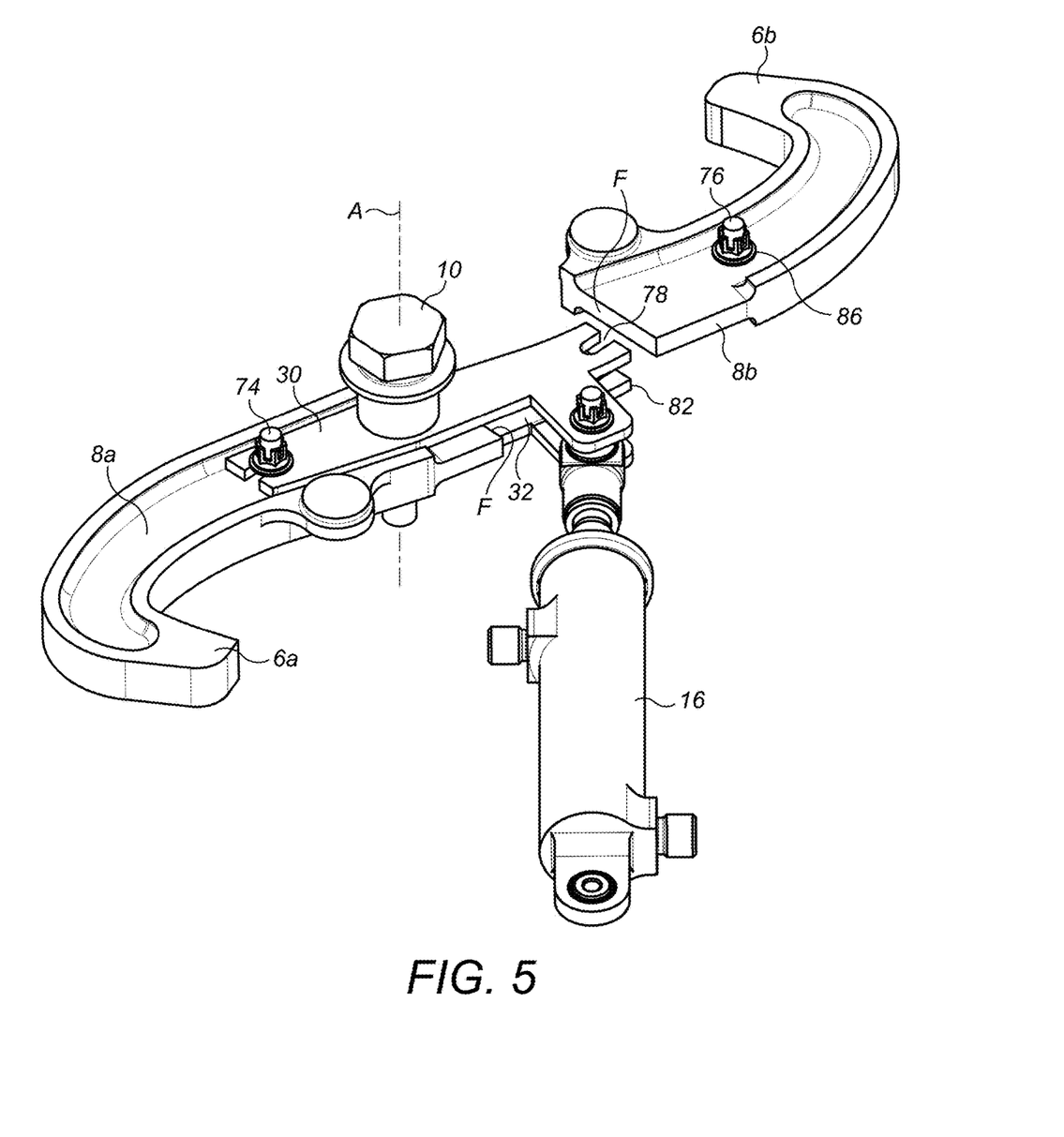
FIG. 5 shows a first possible failure mode of the locking mechanism of FIG. 1.

Having described the structure of the locking mechanism 2, its operation will now be described with additional reference to FIGS. 5 to 7.

In normal operation of the locking mechanism 2, extension and retraction of the actuator 16 will be transmitted to the coupling 24. The coupling 24 transmits load into the respective arms 8a, 8b of the locking member via the dog elements 74, 76. The load is transmitted independently into the respective arms 8a, 8b via the respective dog element 74, 76. Thus extension of the actuator 16 from the position shown in FIGS. 1 to 4 will cause the locking member 4 to rotate counter-clockwise into a locking position in which the locking hooks 6a, 6b engage with their corresponding catches 26a, 26b. Retraction of the actuator 16 will cause rotation of the locking member in a clockwise direction, thereby disengaging the hooks 6a, 6b from the catches 26a, 26b.

If for some reason the locking member arm 6b were to suffer a fracture at a position between the ends 80 of the coupling elements 30, 32 and the pivot 10 (as is illustrated schematically in FIG. 5, opposed surfaces F fracture being shown) the locking member arm 6b will be able to disengage from the coupling elements 30, 32 as the dog element 76 is able to disengage from the slots 78 formed in the ends 80 of the coupling elements 30, 32. As discussed above, the fastener 86 which retains the dog element 76 is not tightened so much as to prevent the locking member arm 8b, together with the dog element 76, from disengaging from the slot 78 and thus from the coupling elements 30, 32. Also, the angling of the slot 78 may facilitate this disengagement. In this way, any adverse loading which might previously have been transmitted back to the actuator 16 is avoided.

In addition the rotational drive to the other locking member arm 8a is maintained through the coupling elements 30, 32 and the dog element 74. Thus unlike prior arrangements, fracture of the locking member 2 at a position intermediate its pivot and its attachment to the actuator will not result in the loss of locking at both locking hooks 6a, 6b but only at the fractured hook. This may be of particular importance where some locking function is desirable, for example in safety critical applications.

Figure 6:
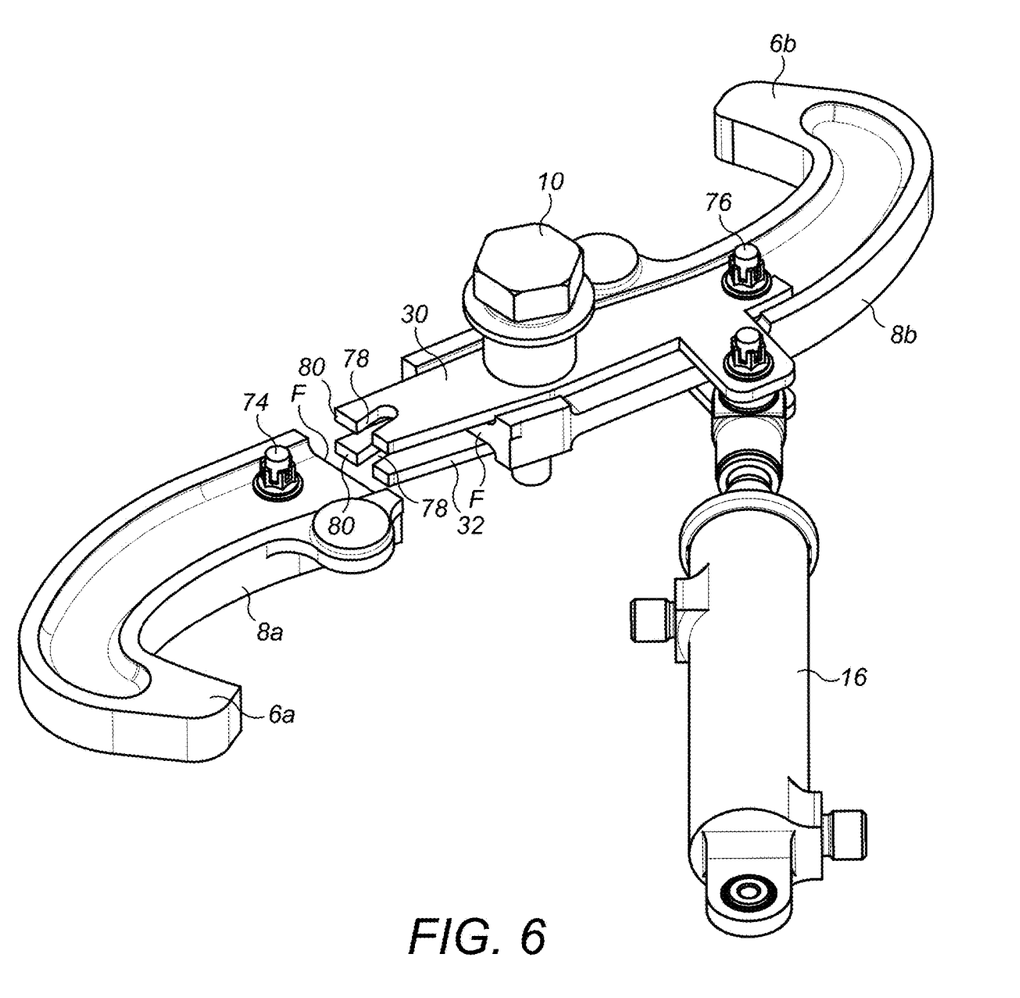
FIG. 6 shows a second possible failure mode of the locking mechanism of FIG. 1.

Turning now to FIG. 6, this illustrates schematically a fracture in the locking member arm 8a at a position between the ends 82 of the coupling elements 30, 32 and the pivot 10, opposed surfaces F fracture being shown. In a similar fashion to the fracture discussed above, the fractured arm section 8a will be able to separate from the coupling elements 30, 32 thereby avoiding adverse loading on the actuator 16 and also allowing drive to be transmitted to the other locking member arm 8b through the coupling elements 30, 32 and the dog element 76.

Figure 7:
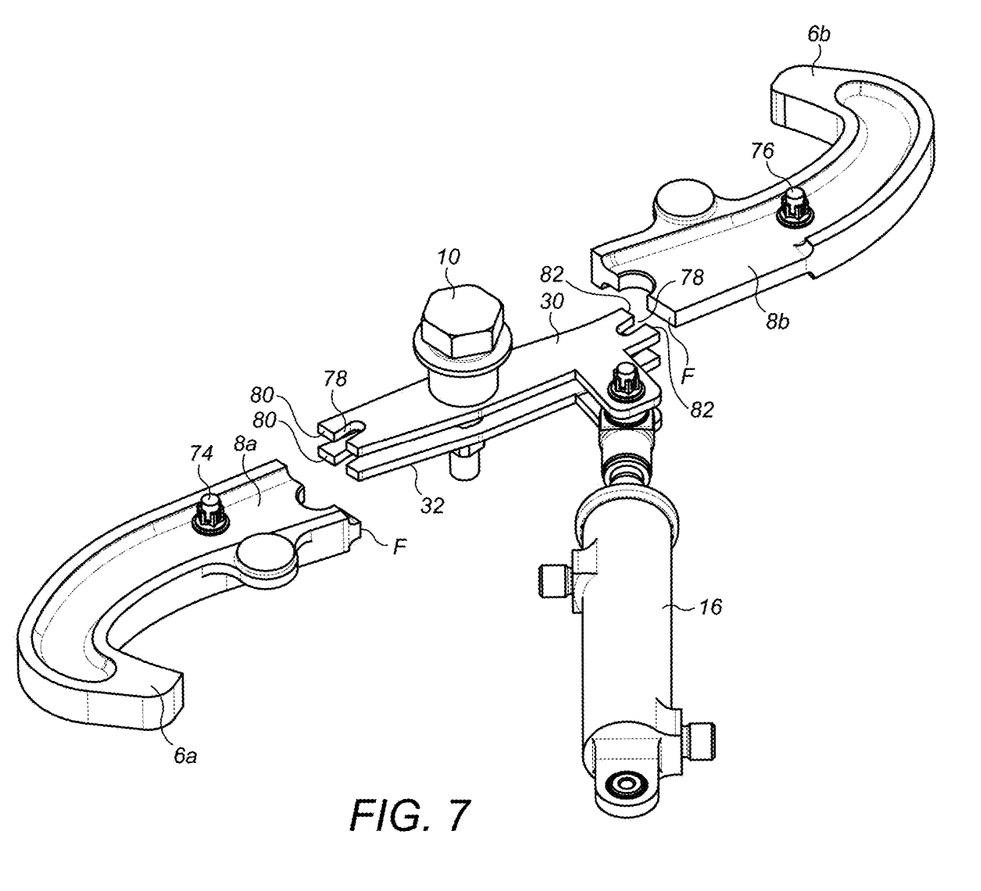
FIG. 7 shows a third possible failure mode of the locking mechanism of FIG. 1.

With reference to FIG. 7, this illustrates schematically a fracture occurring through the locking member 4 at the pivot 10, opposed surfaces F fracture being shown. In this case, no drive can be transmitted to the locking member arms 8a, 8b, but at least the locking member arms 8a, 8b are able to disengage from the coupling elements 30, 32, thereby avoiding adverse loading on the actuator 16.

Figure 8:
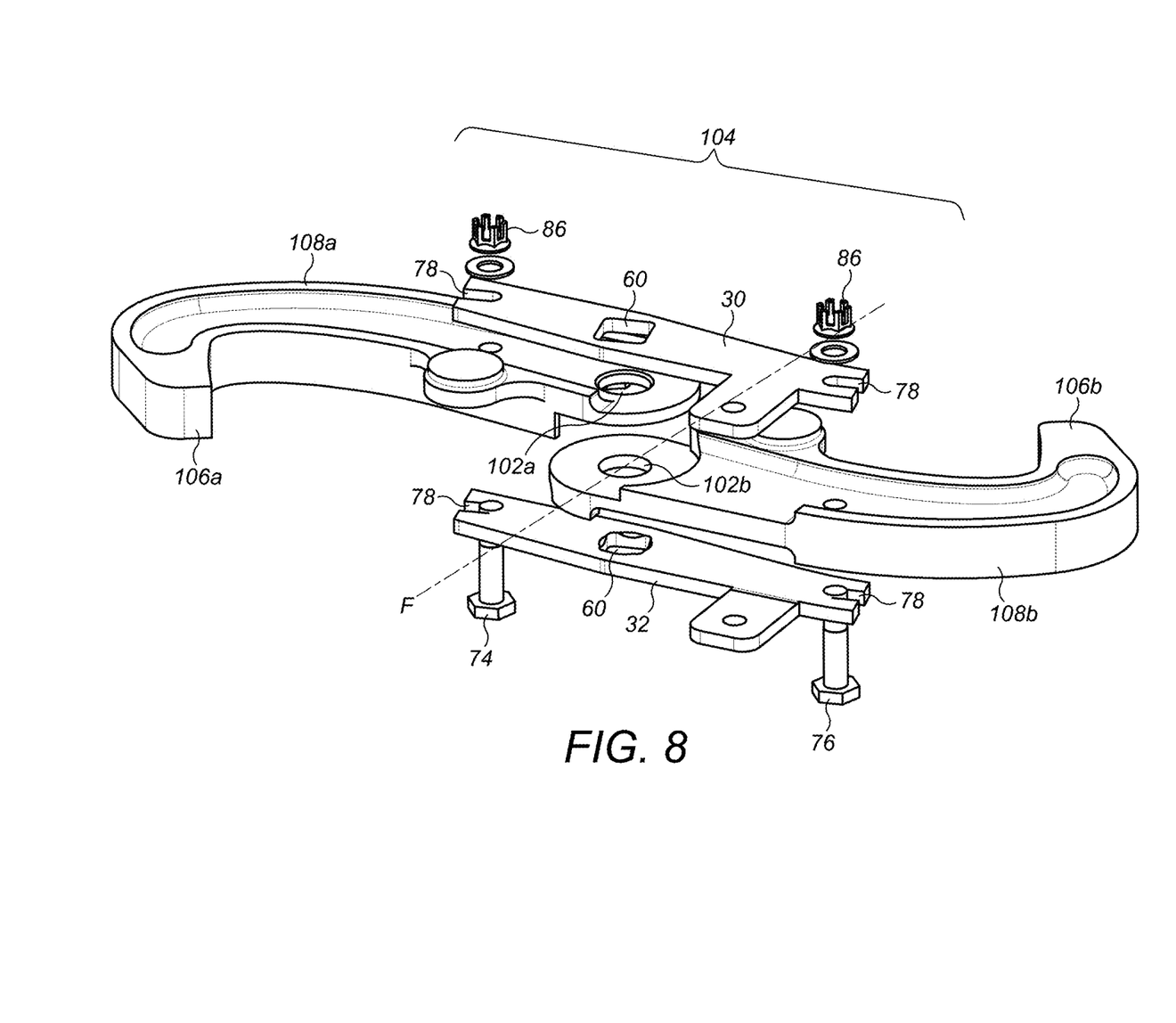
FIG. 8 shows an exploded view of a further embodiment of locking mechanism in accordance with the disclosure.

To avoid the possibility of a fracture at the pivot 10 leading to a complete loss of locking function, in the embodiment of FIG. 8, instead of the locking member 4 being formed as a unitary one-piece element, it is formed in two pieces. Thus in the embodiment of locking mechanism 102 illustrated in FIG. 8, a locking member 104 comprises respective, separate opposed locking member arms 108a, 108b. Each of the locking member arms 108a, 108b extends beyond the pivot 10 (which has been omitted for clarity in FIG. 8) and the end regions of the locking member arms 108, 108b have respective aligned openings 102a, 102b for receiving the pivot 10. It will be seen that with such an arrangement, should one of the locking member arms 108a, 108b fracture at the pivot 10 (along a plane F shown in the Figure), then that arm 108a, 108b will be able to disengage from the coupling plates 30, 32 while leaving the drive to the other arm 108a, 108b via the coupling elements 30, 32 intact. The other features of the locking mechanism 102 are the same as those of the above described locking mechanism 2 and need not therefore be described again.

In the embodiments described above, the coupling 22 comprises a pair of coupling elements 30, 32 which sandwich the locking member 4, 104 between them. This allows a simple pivot coupling to be provided on the actuator 16. In other embodiments, however, a single coupling element may be provided. For example in some embodiments, the coupling elements 30, 32 may be joined by a joining web. In another embodiment, however, illustrated in FIGS. 9 and 10, a single plate-like element 230 may be provided. Such a coupling member 230 may have a structure generally similar to that shown in the earlier embodiments for example. As shown, in this embodiment, the coupling element 230 may be sandwiched between two locking member arms 208a, 208b which together form a locking member 204. Such locking member arms 208a, 208b may have a similar construction to those illustrated in FIG. 8, but modified so as to be able to receive the coupling plate 230 therebetween. With such an arrangement, a clevis coupling 223 is provided at the end 222 of the actuator 16.

Figure 9:
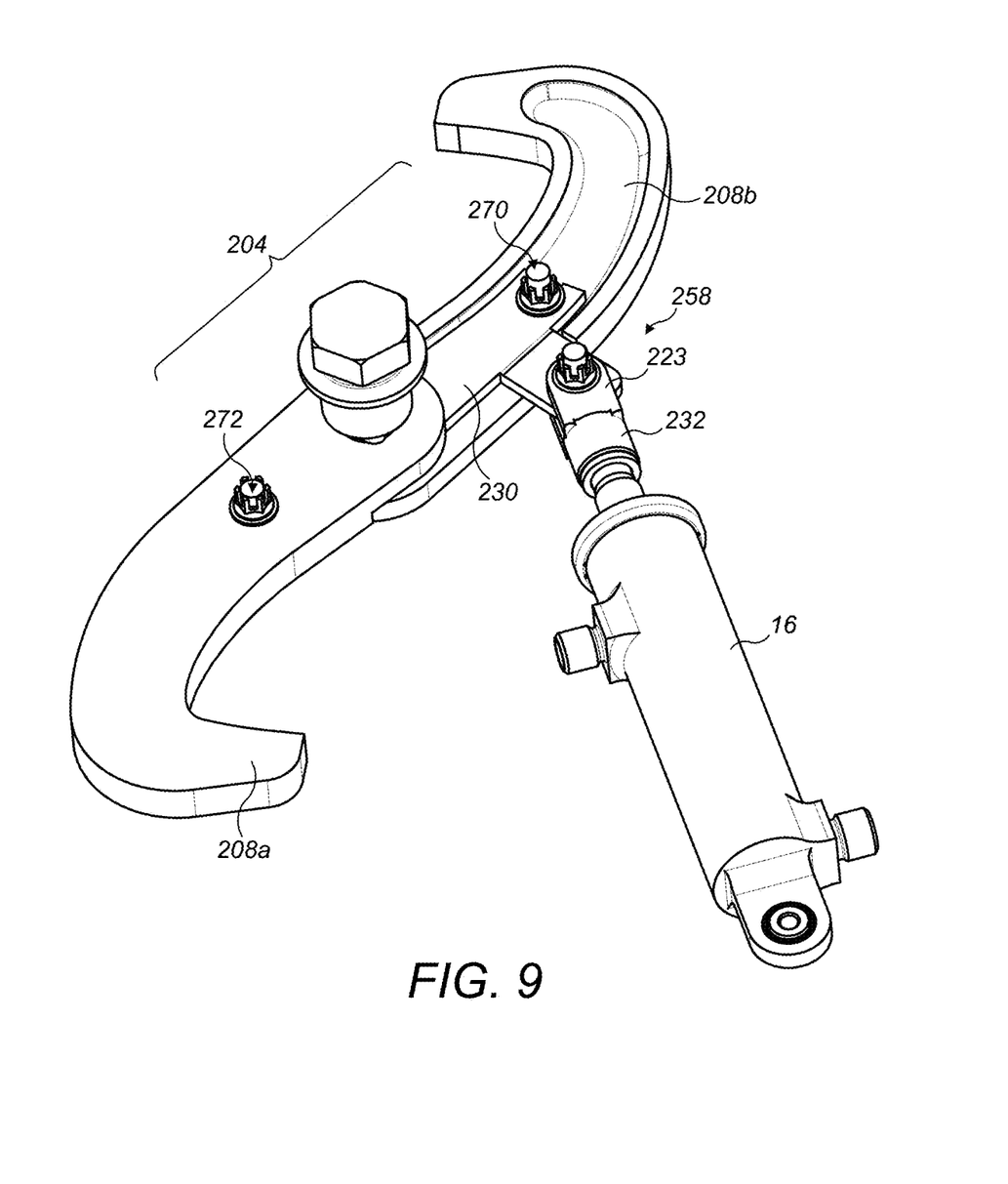
FIG. 9 shows a yet further embodiment of locking mechanism in accordance with the disclosure.
Figure 10:
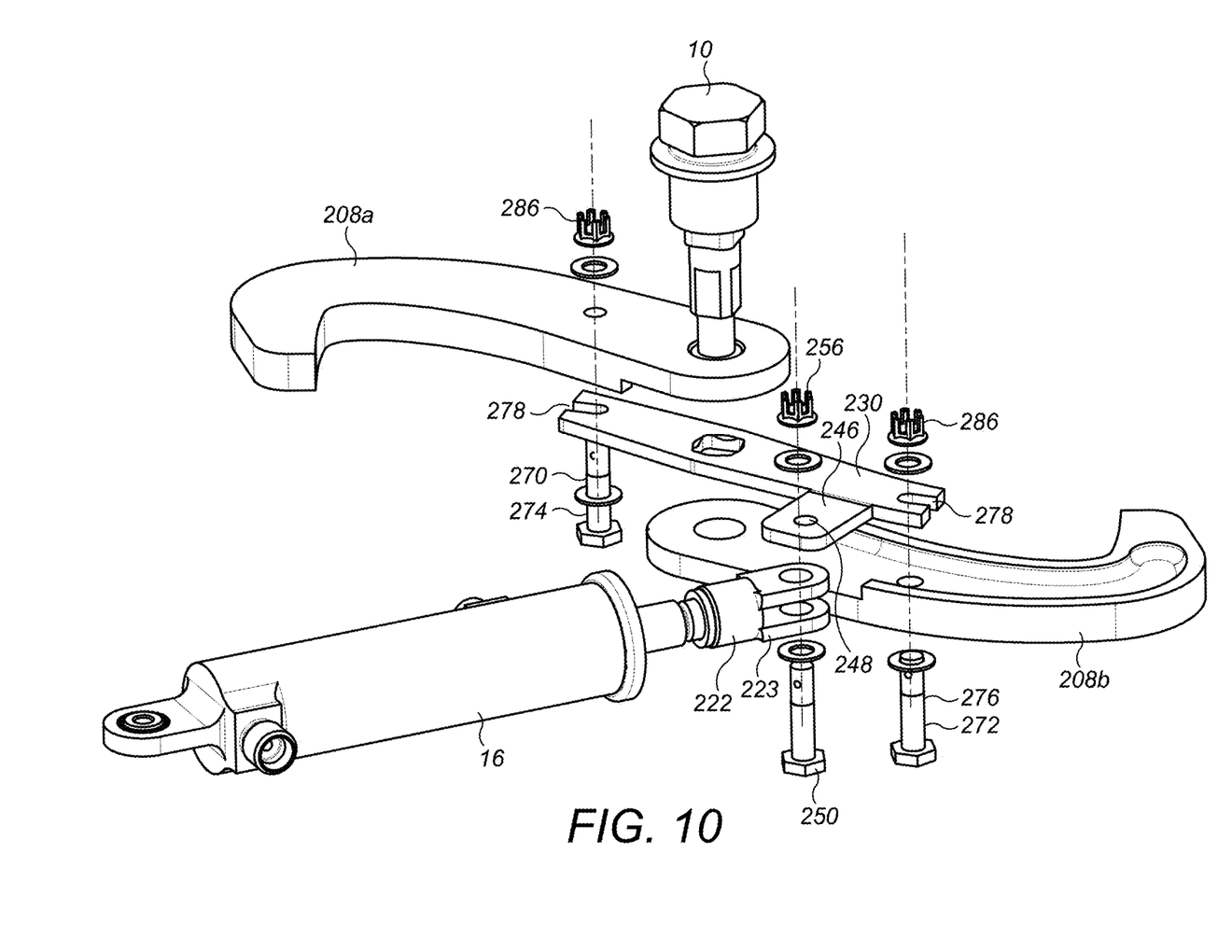
FIG. 10 shows an exploded view of the embodiment of FIG. 9

The clevis coupling 223 receives a bolt 250 which passes through an opening 248 in the side arm 246 of the coupling member 230 and is retained by a fastener 256. This provides a pivotal actuator coupling 258 between the actuator 16 and the coupling elements 230.

The coupling element 230 is connected to the locking arms 208a, 208b in a similar manner to the earlier embodiments, by couplings 270, 272 using dog elements 274, 276 and slots 278. As in the earlier embodiments, the fasteners 286 may be tightened to a sufficient degree to attach the coupling member 230 to the locking member arms 208a, 208b but to allow disengagement of the locking member arms 208a, 208b from the coupling member in the event of a fracture.

From the above, it will be seen that particular embodiments of this disclosure are particularly advantageous. By providing drive independently to the respective arms of the locking member, should one of those arms break, the locking movement of the actuator will still be transmitted to the other locking member arm, allowing for at least partial locking. This may be advantageous in certain applications. For example, in a bucket or clamshell thrust reverser door system, upper and lower thrust reverser doors may be held by the hooks 6a, 6b. In operation it would be expected that the hooks 6a, 6b would remain in place under large shock loads by means of the actuator deploy force. If one of the hooks 6a, 6b were to fail, the other of the hooks 6a, 6b would be able to react to the shock loads as the actuator means was still functionally attached to that hook 6a, 6b. This is advantageous as it is undesirable to lose both thrust reverser doors in event of failure.

Also, by permitting fractured arms to disengage from the coupling, should a fracture occur, adverse loads from the fractured arm will not be transmitted back to the actuator. This will improve survivability in case of failure, and would reduce loading on the actuator somewhat during flight, thereby improving actuator life.

It will be understood that the above embodiments are merely exemplary of the disclosure and that modifications and changes may be made thereto without departing from the disclosure. For example, in some embodiments, the dog elements may be formed as part of the locking member arms rather than as elements separate therefrom. In other embodiments, the pivot 10 may be formed of portions of the coupling element(s) 30, 32, 230. For example one or more of the coupling elements 30, 32, 230 may have the pivot 10 formed integrally therewith, rather than being a separate component keyed thereto. Also, while the locking mechanism has been described as being used in a thrust reverser system, it may be used in other applications where simultaneous locking of two components is required.

The invention claimed is:

1. A locking mechanism comprising:
   an S-shaped locking member comprising respective locking hooks arranged at an end of opposed arms of the locking member;
   a pivot arranged between the opposed arms of the locking member and around whose axis (A) the locking member rotates;
   a coupling for coupling the locking member to an actuator for rotating the locking member around the pivot axis (A), the coupling comprising:
   at least one coupling element;
   an actuator coupling for coupling the at least one coupling element to the actuator; and
   first and second drive couplings for coupling the at least one coupling element independently to each arm of the locking member for transmitting rotational movement thereto, such that failure of one arm of the locking member will not cause loss of drive to the other arm of the locking member;
   wherein the first and second drive couplings each comprise a dog element engaging with the at least one coupling element and the locking member;
   wherein the dog element is a drive pin or bolt extending from the respective locking member arm;
   wherein the drive pin or bolt extends through the at least one coupling element and the respective locking member arm; and
   wherein the dog element is received in an open ended slot formed in an end of a coupling element.

2. A locking mechanism as claimed in claim 1, wherein the at least one coupling element comprises a plate.

3. A locking mechanism as claimed in claim 1, wherein an axis (B) of the slot extends at an acute angle to an axis (C) passing between the dog elements and through the pivot axis (A).

4. A locking mechanism as claimed in claim 1, wherein the at least one coupling element is located in a recess formed in a face of the locking member.

5. A locking mechanism as claimed in claim 1, comprising a pair of coupling elements, arranged on opposed faces of the locking member so as to sandwich a portion of the locking member therebetween.

6. A locking mechanism as claimed in claim 1, wherein the locking member (4) is formed as a unitary, one piece element.

7. A locking mechanism as claimed in claim 1, wherein the locking member comprises two separate opposed arms each pivotally mounted about the pivot axis (A).

8. A locking mechanism as claimed in claim 1, comprising a single coupling element.

9. A locking mechanism as claimed in claim 8, wherein the locking member comprises two separate opposed arms each pivotally mounted about the pivot axis (A) and the single coupling element is sandwiched between the opposed arms of the locking member.

10. A locking mechanism as claimed in claim 1, wherein the actuator coupling comprises an arm extending laterally from the coupling element.

11. A locking mechanism as claimed in claim 1, further comprising the actuator coupled to the actuator coupling for rotating the locking member around the pivot axis (A).

* * * * *